INVENTORS
SHELBY L. YORK JR
HIRAM S. SIBLEY
BY Thomas S. MacDonald

ATTORNEY

INVENTORS
SHELBY L. YORK JR
HIRAM S. SIBLEY
BY Thomas S. MacDonald
ATTORNEY

June 18, 1963   S. L. YORK, JR., ET AL   3,093,963
MANIFOLDED EXHAUST DUCT
Filed July 17, 1959   4 Sheets-Sheet 3

INVENTORS
SHELBY L. YORK, JR.
HIRAM S. SIBLEY
BY Thomas S. Macdonald
ATTORNEY

June 18, 1963 S. L. YORK, JR., ET AL 3,093,963
MANIFOLDED EXHAUST DUCT
Filed July 17, 1959 4 Sheets-Sheet 4

INVENTORS
SHELBY L. YORK JR
HIRAM S. SIBLEY
BY
Thomas S. MacDonald
ATTORNEY

United States Patent Office 3,093,963
Patented June 18, 1963

3,093,963
MANIFOLDED EXHAUST DUCT
Shelby L. York, Jr., Tarzana, and Hiram S. Sibley, Newport Beach, Calif., assignors to North American Aviation, Inc.
Filed July 17, 1959, Ser. No. 827,746
7 Claims. (Cl. 60—35.6)

This invention relates to a means for dispersing exhaust gases in a rocket engine system and more particularly to a turbine exhaust duct structure as applied to rocket engines, and to the looping of the tubes of a tubularly-constructed, regeneratively-cooled rocket engine thrust chamber to facilitate the passage of turbine exhaust gases directly into the thrust chamber nozzle.

Heretofore it has been the practice in the field of rocketry to produce hot gases by means of a gas generator and to impinge those gases upon the blades of a turbine, causing the turbine to spin and drive oxidizer and fuel pumps. The gases exhausting from the turbine have been collected in a conduit and conducted to the vicinity of the after end of the rocket engine and/or the vehicle to which it was affixed. The gases were exhausted directly to the atmosphere from that position. This practice has resulted in several characteristics detrimental to efficient vehicle operation.

One of the primary detriments of conventional exhaust systems, as applied to missile powerplants, has been the heating of the missile boat-tail (powerplant housing) interior by the turbine exhaust gases. On occasion this has resulted in actual burning of components and wiring installed within the boat-tail, the result being a system failure. The structure of this invention, by making possible the passing of gases directly into the rocket engine thrust chamber, obviates such exhausting within the boat-tail and eliminates the problems associated therewith.

Boat-tail heating problems have also been solved in some instances by the passage of exhaust gas overboard through an opening in the side of the boat-tail structure. This solution to the heating problem has required an aerodynamically undesirable opening in the missile structure. Additionally, it has resulted in another major detriment of conventional systems, i.e. side forces causing unbalanced or unsymmetrical total thrust.

Unbalanced thrust is inherent in most prior art rocket engine systems since turbine exhaust gases are generally exhausted at only one side of the engine. The resultant unsymmetrical total rocket engine thrust is determined with respect to the theoretical center line of thrust of the thrust chamber proper. The present system eliminates side force by providing a manifold capable of dissipating the turbine exhaust into the thrust chamber symmetrically about the thrust chamber center line.

The symmetrical dissipation of gases also results in the simplification of engine manufacture for achieving missile vector control. When rocket engines are gimbal-mounted for missile control purposes, it is necessary that the gimbal be installed upon the rocket engine system's center line of thrust. This would be a simple procedure were the turbine gases exhausted symmetrically, however, the unsymmetrical total thrust of conventional rocket engine systems, resultant from turbine exhaust location, has necessitated the movement of the gimbal off the theoretical thrust chamber center line of thrust to a new location. The relocation procedure is tedious, exacting, and expensive. The symmetrical gas dissipation of the present system allows the gimbal to be brought back to the original center line of thrust, eliminating the necessity for such procedures.

Additionally, the present invention has the ability to efficiently utilize the total available thrust of the rocket engine by taking full advantage of the usable turbine exhaust gas thrust. This latter thrust may be of the order of 1,000 lbs. in a 60,000 lb. rocket engine. The exhaust dispersement also increases combustion efficiency in the nozzle and increases the ultimate system thrust.

An object of this invention is to provide an efficient turbine exhaust gas distribution system for a rocket engine.

A further object is to provide means for dispersing turbine exhaust gas directly into the thrust chamber and symmetrically about the periphery thereof.

Another object is to provide means in a tubularly-constructed, regeneratively-cooled rocket engine whereby gases may be passed between the tubes and directly into the thrust chamber.

Yet another object is to provide means in a rocket engine whereby the usable thrust available in a turbine exhaust may be effectively utilized while maintaining the original thrust vector center line.

Other objects will become apparent from the following description taken in connection with the accompanying drawings, in which.

Figure 1:
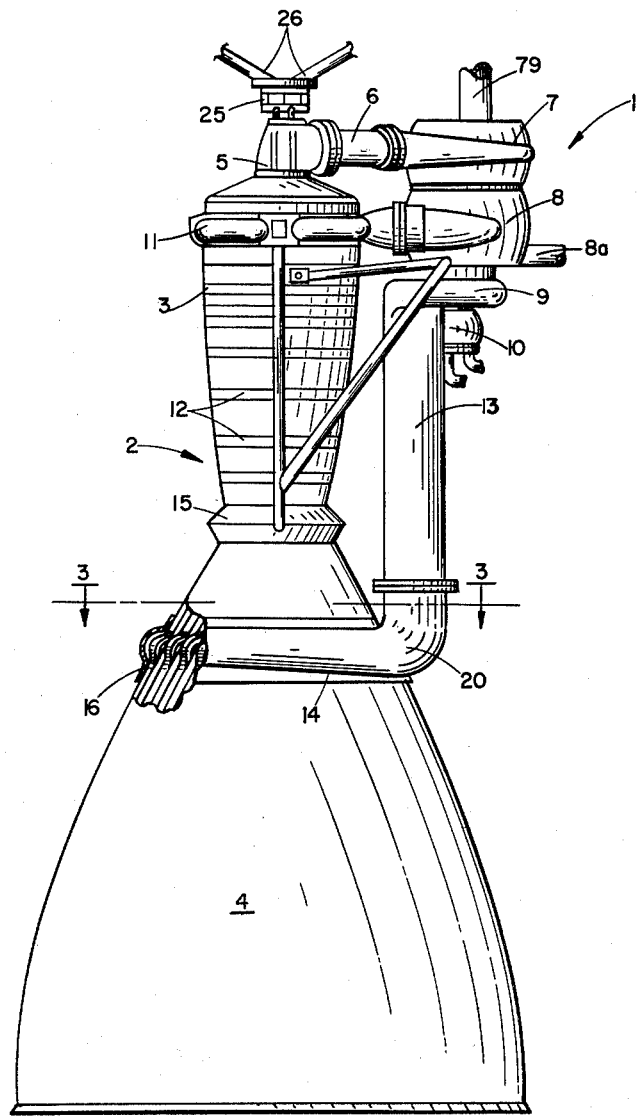
FIG. 1 is a partially cut-away, elevational view of a rocket engine incorporating this invention.

Referring to FIG. 1, a rocket engine is generally indicated as 1. Rocket engine 1 is comprised of a thrust chamber 2, having a combustion chamber portion 3 and a nozzle portion 4. Attached to the upper extremity of combustion chamber 3 is a propellant inlet 5. Inlet 5, when located in the illustrated position, is normally utilized to introduce a conventional oxidizer into a propellant injector (not shown). Attached to oxidizer inlet 5 by a conduit 6 is an oxidizer pump 7, manufactured in accordance with commercially known techniques. A fuel pump 8, of similar construction, is attached to one end of oxidizer pump 7. A turbine (not shown) is located within housing 9 and situated adjacent fuel pump 8. The turbine is attached to a shaft (not shown) common to both the oxidizer and fuel pumps and is adapted to drive those pumps when spun by means of hot gases produced in a gas generator 10 in communication therewith. Gas generator 10 may be of the liquid type shown, or a solid propellant type. In either event, it may be of conventional construction and operation. A typical liquid propellant gas generator adaptable to this system is described in Patent No. 2,531,761. A fuel manifold 11, attached about the upper portion of combustion chamber 3, is connected to fuel pump 8 and adapted to transmit fuel from pump 8 into a series of regenerative cooling tubes extending longitudinally of thrust chamber 2 and forming a portion of the thrust chamber wall. These tubes are normally held in place by brazing and by hoop tension bands 12. A conduit 13 is attached to turbine housing 9 for receiving turbine exhaust gases leaving the housing. Conduit 13 leads from turbine housing 9 to a turbine exhaust manifold 14, circumferentially surrounding nozzle 4 near the throat 15 of the thrust chamber.

The exact location of the manifold 14 upon nozzle 4 may vary from chamber to chamber, dependent upon the particular thrust chamber design in relation to the internal low pressure area below throat 15. Turbine exhaust manifold 14 is provided with flanges 16 which may be welded, brazed, or otherwise bonded to the external periphery of nozzle 4. It is necessary, however, that the bond be gas-tight, in order that turbine exhaust gases transmitted to the manifold are prevented from escaping through the bonded area. The shape of manifold 14 is preferably of constantly diminishing cross section from its point of connection to conduit 13 to the point most remote from that connection. The connection proper is preferably paired to promote smooth gas flow. These characteristics are most clearly illustrated in FIGS. 1, 3, and 5.

Figure 2:
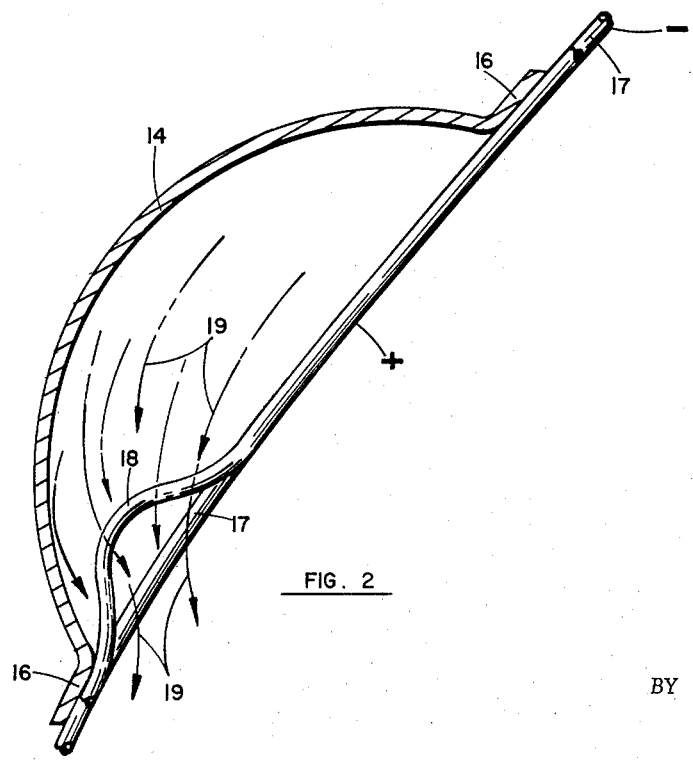
FIG. 2 is a sectional view illustrating looped regenerative cooling tubes within a turbine gas dispersing manifold.
Figure 3:
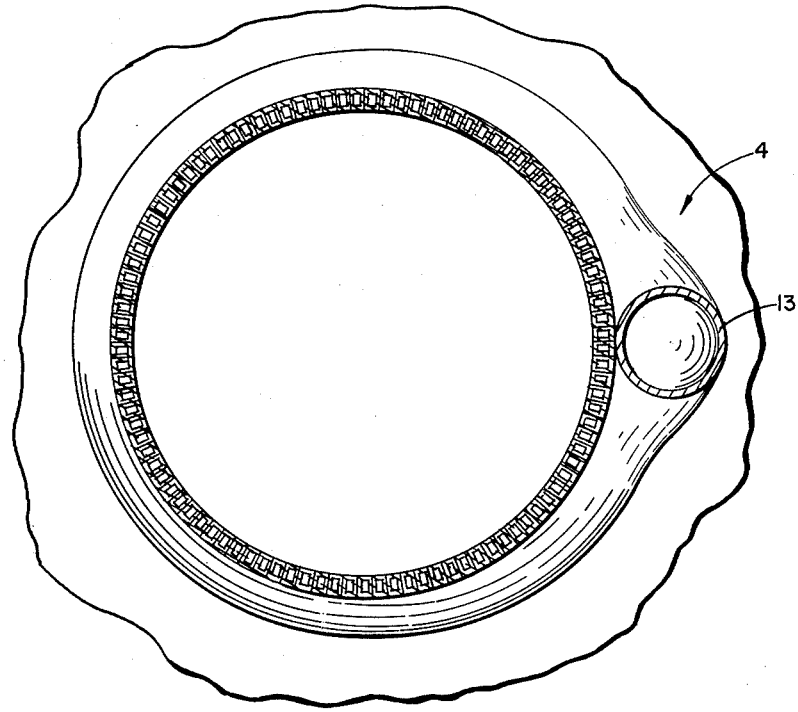
FIG. 3 is a sectional view of a thrust chamber and turbine exhaust gas dispersing manifold taken along lines 3—3 of FIG. 1.
Figure 4:
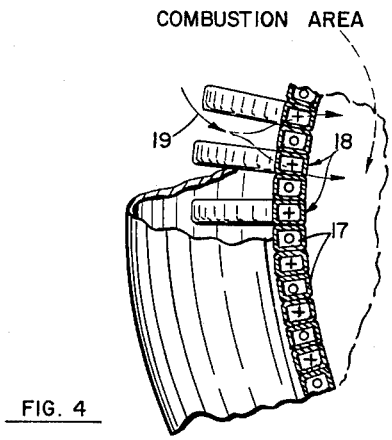
FIG. 4 is an enlarged sectional view partially cut-away to show the looped coolant tubes of FIG. 3.

The tubular wall construction of thrust chamber 2 is in accordance with currently known and practiced techniques. Each longitudinal tube is of varying cross section between its extremities. By properly controlling the cross sectional variation and by placing the formed tubes in a circumferential pattern, as shown in FIGS. 3 and 4, the ultimate thrust chamber shape is controlled as desired, e.g., the thrust chamber shape illustrated in FIGS. 1 and 2. Regenerative cooling is accomplished by passing one of the propellants, usually fuel, as a coolant, down the length of each second tube and back up through the adjacent tubes. This is illustrated in FIG. 4, wherein a portion of the thrust chamber wall of FIG. 3 is enlarged to show the tubes in cross section. Coolant travels through tubes marked with a cross (+) in one direction and returns through the tubes marked with a circled dot (⊙) in the opposite direction. The coolant absorbs heat from the combustion area of the thrust chamber through the tube walls, thereby maintaining the chamber wall at an operable temperature. While the structure of the present invention may be applied to other forms of regeneratively-cooled thrust chambers, e.g., double walled construction, it is particularly well suited to the tubular walled type. In either case, passages are formed in the nozzle wall so as to communicate between the interior of nozzle 4 and the interior of manifold 14. This is accomplished in tubular chambers by the bending or looping outwardly of alternate tubes, or every third tube, from which the nozzle is constructed. The loops are completely enclosed between manifold 14 and nozzle 4. The series of passages formed between the tubes and the surrounding manifold are utilized for distributing the turbine exhaust gases directly into the interior of nozzle 4. FIGS. 1 and 3 (cut-away portions) and FIGS. 2 and 4 illustrate the manner in which cooling tubes are bent to provide passages in the nozzle wall. Manifold 14 and regenerative-cooling tubes 17 and 18 are enlarged in FIGS. 2 and 4 to show tube bending or looping, the formation of passages between adjacent tubes, and the preferred relative location of the loops within manifold 14. In its preferred embodiment, this invention is practiced by the bending or looping of every second tube about the circumferential periphery of nozzle 4. Every second tube, designated at 17, is continued in its normal contour throughout the area enclosed by manifold 14. Alternate tubes 18 are bent outwardly to a depth sufficient to establish a series of complete discontinuities between tubes 17 and 18. Hence, a series of passages 19, as indicated by the arrows so labeled, are formed between each second tube in the area of the loops. The total number of passages so formed may be varied as compatible with particular engine requirements. It is important that the passages be distributed evenly about the periphery of nozzle 4 in order that gases entering therethrough might be symmetrically disposed within the nozzle. This requirement is also the prime reason for diminishing the cross sectional area of turbine exhaust manifold. The diminishing cross section serves as a pressure equalizer in keeping the exhaust gas pressure essentially constant over the whole of the manifold, thus preventing an unwarranted amount of gas from entering the passages near the manifold entrance while starving the passages remote therefrom. The dimensional relationship between manifold 14 and the length and depth of the tube loops are conditional upon the particular engine system characteristics, taking into consideration such variables as the turbine exhaust gas volume of the individual engine. The main requirements are that the passage sizes and the manifold diminution be so controlled as to allow complete and equal distribution of the total exhaust produced without causing undue back pressure within the system, and to maintain a pressure drop ($\Delta P$) between the manifold and the interior of the thrust chamber throughout system operation.

Figure 6:
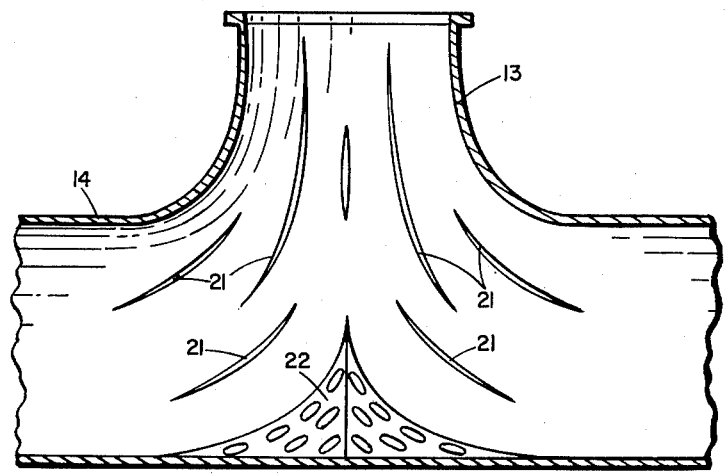
FIG. 6 is a side view of the baffles of FIG. 5.
Figure 5:
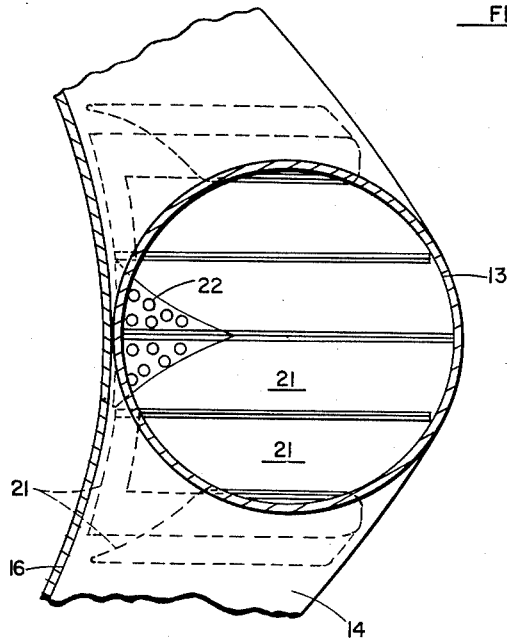
FIG. 5 is a view looking into the manifold inlet and illustrating a typical baffle system.

It has been found desirable to provide baffles within either one or both conduit 13 and manifold 14 in the general location indicated as 20 (FIG. 1) for the purpose of redirecting the exhaust gases into manifold 14 from conduit 13 in a smooth and controlled flow. A typical baffle pattern usable for this purpose is illustrated in FIGS. 5 and 6. Therein a plurality of baffles 21 are curved to varying degrees in either direction from conduit 13 to manifold 14. A perforated baffle grid or screen 22 covers passages 19 in the area of the exhaust inlet from conduit 13 to prevent the full force of the gases from entering passages 19 directly. Other similar arrangements may also be utilized.

FIG. 2 further illustrates the most desirable location of the loops within the manifold. This location is at the lower extremity of the manifold. The desirability of such location results from the tendency, during engine tests, of unburned propellants entrained in the turbine exhaust gases to accumulate in the "trap" naturally formed at the bottom of the manifold when the tube loops are located at a higher position than illustrated. After cooling, the trapped propellants from a gel which is highly explosive and easily triggered by subsequent engine handling or operation. The effect of the placement of the tube loops at the lower extremity of the manifold, when the engine is oriented with the nozzle exit directed downward, is to eliminate the trap and the consequent dangerous conditions.

In a typical operational sequence of the FIG. 1 system, liquid propellants are introduced into gas generator 10 which is then ignited by a conventional igniter unit (not shown) causing vast quantities of hot gases to be produced. These gases are directed into turbine housing 9 where they impinge upon the turbine blades, causing the turbine to spin at high speed. The turbine, through its mechanical connection to pumps 7 and 8, causes propellants entering those pumps through lines 7a and 8a to be pumped into inlet 5 and manifold 11, respectively. These propellants are later, and in a sequence not material to this invention, injected into the combustion chamber, ignited, and expanded through nozzle 4 with a resultant propulsion force or thrust. The gas generator gases, after driving the turbine, are bled from turbine housing 9 into conduit 13 and transmitted to manifold 14. They are next circulated about the interior of manifold 14 and directed through passages 19, between tubes 17 and 18 into nozzle 4, where they join with the primary rocket engine exhaust gases, adding to the ultimate engine thrust.

A gimbal 25 is shown representatively in FIG. 1 as being mounted upon the top of a rocket engine 1 in essentially a standard position and adapted to allow the entire rocket engine to be pivoted thereon with respect to mounting structure 26. Mounting structure 26 is attached in turn to the vehicle which the rocket engine is adapted to propel. As above noted, this gimbal may now, resultant from the equal exhaust distribution within the nozzle, be located in the most desirable position upon the original engine thrust vector center line. A typical gimbal used may be that shown in U.S. application Serial No. 586,383, filed May 11, 1956, now Patent No. 2,842,564.

Figure 7:
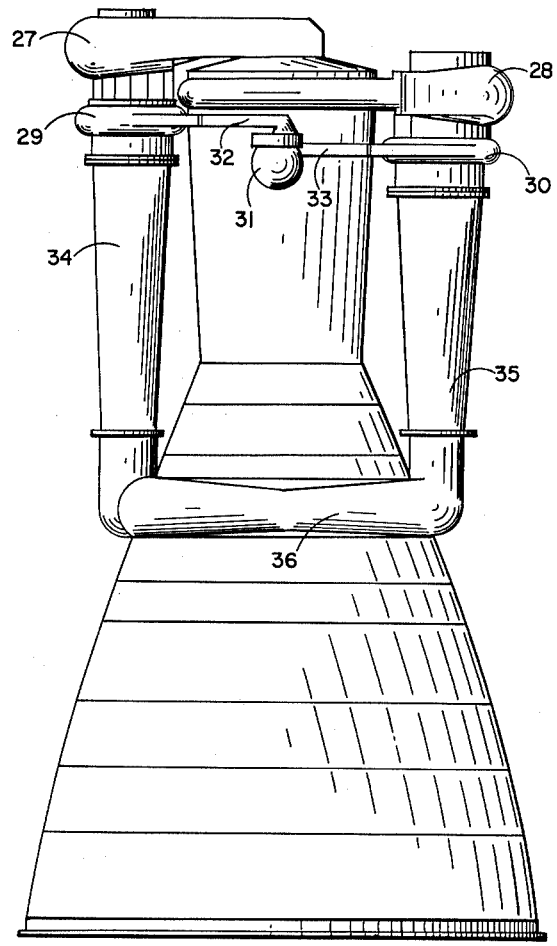
FIG. 7 is an elevational view illustrating a variation of the exhaust distribution system of FIG. 1.

An alternate configuration of the manifold of the present invention is illustrated in FIG. 7 wherein the oxidizer pump 27 and fuel pump 28 are separate and are driven by separate turbines 29 and 30, respectively. Both turbines are driven by a gas generator 31 through conduits 32 and 33. Turbine exhaust conduits 34 and 35 are attached to turbines 29 and 30 respectively and adapted to receive turbine exhaust gases therefrom. Conduits 34 and 35 transmit the exhaust gases to annular manifold 36 sealably attached about the periphery of the thrust chamber in essentially the same manner as described with respect to manifold 14 of FIG. 1. Here, however, annular manifold 36 has a maximum cross sectional area at each attachment point to conduits 34 and 35, and diminishes in cross section to points intermediate the conduit connections. The ultimate purpose of equal turbine exhaust gas distribution about the periphery of the nozzle is thus accomplished by utilizing the initially described diminishing characteristics, but with a plurality rather than a single gas inlet to the manifold. The total number of conduits introducing gases into the annular manifold is immaterial, so long as such introduction is symmetrical about the circumference of the manifold, thus preventing an adverse effect on the thrust vector.

The source of turbine drive gases need not be from a gas generator as illustrated in the drawings. Other sources of turbine gases are equally as usable. For example, hot gases may be bled and collected from a position adjacent the main propellant injector in the main combustion chamber via a series of apertures in the periphery of the combustion chamber walls without detrimental effect upon the operation of the engine or the present turbine exhaust gas distribution system.

One prime benefit of the present manifolding system, not heretofore mentioned, is the ability which it provides to maintain a constant back pressure on the turbine independent of altitude. This ability is inherent in the closed type systems illustrated herein, these systems having their exits in pressurized regions. This constant back pressure allows the turbines to be operated in a continuously controlled manner. The net result is a highly controllable propellant pumping system, and an enhancement of ultimate system operation irrespective of specific or constantly changing operational altitudes.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A turbine exhaust gas dispersing reaction motor nozzle comprising a continuous wall constructed from a series of adjacently positioned tubes secured together in a substantially gas impervious condition, a turbine exhaust receiving manifold sealed over portions of said tubes peripherally about said series of tubes, passage means provided between adjacent said portions, said passage means being provided by substantially radially extending loops in a plurality of said tube portions such that said passage means communicate between the interior of the nozzle and the interior of said manifold.

2. A turbine exhaust gas dispersing system for a liquid propellant rocket engine having a thrust chamber terminating in a nozzle formed of a continuous series of adjacent, elongated, coolant tubes, a turbine connected to and adapted to drive a propellant pump supplying propellant to the thrust chamber, and a hot gas source connected to the turbine for supplying gases to drive the turbine; said system comprising a conduit connected to the turbine to receive gases exhausted therefrom, an annular manifold connected to said conduit, said manifold disposed about and sealably connected to the nozzle and being of constantly diminishing cross section from said conduit connection, each of a plurality of said elongated tubes having a loop formed therein so as to provide a discontinuity with adjacent non-looped tubes over the length of said loop, each said discontinuity forming one of a plurality of passages communicating between the interiors of the nozzle and said manifold, said looped tubes being equally spaced about the nozzle periphery.

3. A turbine exhaust gas dispersing system for a liquid propellant rocket engine having a thrust chamber terminating in a nozzle formed of a continuous series of adjacent, elongated, coolant tubes, a turbine connected to an adapted to drive a propellant pump supplying propellant to the thrust chamber, and a hot gas source connected to the turbine for supplying gases to drive the turbine; said system comprising a conduit connected to the turbine to receive gases exhausted therefrom, an annular manifold connected to said conduit, said manifold disposed about and sealably connected to the nozzle and being of constantly diminishing cross section from said conduit connection, each second one of a plurality of said elongated tubes in said nozzle being bent outwardly to have a loop formed therein so as to provide a discontinuity with adjacent non-looped tubes, said loops being contained within said annular manifold, each of said loops providing a discontinuity with adjacent non-looped tubes, said loops and said non-looped tubes defining a series of equally spaced passages interconnecting the interiors of said annular manifold and said nozzle.

4. A turbine exhaust gas dispersing system for a liquid propellant rocket engine having a thrust chamber terminating in a nozzle formed of a continuous series of adjacent, elongated, coolant tubes, a turbine connected to and adapted to drive a propellant pump supplying propellant to the thrust chamber, and a hot gas source connected to the turbine for supplying gases to drive the turbine; said system comprising a conduit connected to the turbine to receive gases exhausted therefrom, an annular manifold connected to said conduit, said manifold disposed about and sealably connected to said nozzle, and being of constantly diminishing cross section from said conduit connection, means forming a plurality of passages in the nozzle within said manifold and between adjacent tubes making up said nozzle, said passages communicating between the interiors of the nozzle and said manifold, and a plurality of distributor baffles to redirect turbine exhaust gases entering said annular manifold from said conduit and prevent direct impingement of said gases upon said passages in said nozzle.

5. A turbine exhaust gas dispersing system for a rocket engine nozzle having tubular wall construction comprising a hollow, exhaust receiving manifold sealed over portions of adjacently positioned and secured tubes making up the tubular wall, said tube portions being exposed to the interior of said manifold, passage means between adjacent ones of said tube portions, said passage means communicating between the interior of said nozzle and the interior of said manifold, passage means being defined by each alternate one of said tube portions being provided with a loop, said loops defining discontinuities with adjacent non-looped tube portions, and a baffle provided internally of said manifold to prevent direct gas impingement against said discontinuities.

6. A turbine exhaust gas dispersing system for a rocket engine nozzle having tubular wall construction comprising a hollow, exhaust receiving manifold sealed over portions of adjacently positioned and secured tubes making up the tubular wall, said tube portions being exposed to the interior of said manifold, passage means between adjacent ones of said tube portions, said passage means communicating between the interior of said nozzle and the interior of said manifold, each of a plurality of said tube portions having a loop formed therein so as to provide a discontinuity with an adjacent non-looped tube over the length of said loop, each discontinuity forming one of said passages, said looped tubes being equally spaced the nozzle periphery.

7. A turbine exhaust gas dispersing system for a rocket engine nozzle having tubular wall construction comprising a hollow, exhaust receiving manifold sealed over portions of adjacently positioned and secured tubes making up the tubular wall, said tube portions being exposed to the interior of said manifold, passage means between adjacent ones of said tube portions communicating between the interior of said nozzle and the interior of said manifold, each alternate one of said tube portions being provided with a loop, said loops defining discontinuities with adjacent tube portions to provide said passage means, said loops being positioned within said manifold such that said discontinuities terminate substantially at a rearward seal between said manifold and said tubes, whereby any propellant entering said manifold is discharged into the nozzle interior through said discontinuities.

References Cited in the file of this patent

UNITED STATES PATENTS

| | | |
|---|---|---|
| 2,814,929 | Morley et al. | Dec. 3, 1957 |
| 2,816,417 | Bloomberg | Dec. 17, 1957 |
| 2,844,939 | Schultz | July 29, 1958 |

FOREIGN PATENTS

| | | |
|---|---|---|
| 459,924 | Great Britain | Jan. 18, 1937 |
| 724,004 | Great Britain | Feb. 16, 1955 |